UNITED STATES PATENT OFFICE.

FREDERICK J. KAUFMANN, OF CHARLESTON, WEST VIRGINIA, ASSIGNOR OF ONE-TENTH TO CHARLES RITCHIE, OF CHARLESTON, WEST VIRGINIA.

PROCESS OF MAKING FATTY-ACID HALIDS AND PHOSPHORUS OXYHALIDS.

1,359,071. Specification of Letters Patent. Patented Nov. 16, 1920.

No Drawing. Application filed January 27, 1920. Serial No. 354,458.

*To all whom it may concern:*

Be it known that I, FREDERICK J. KAUFMANN, a citizen of the United States of America, and resident of Charleston, in the county of Kanawha and State of West Virginia, have invented certain new and useful Improvements in Processes of Making Fatty-Acid Halids and Phosphorus Oxyhalids, of which the following is a specification.

The present invention relates to the production of fatty acid halid compounds with the simultaneous production of phosphorus oxyhalids, and for the purpose of illustration, the production of acetyl chlorid and the production of phosphorus oxychlorid will be hereinafter more fully described, it being understood that other fatty acid chlorids, such as propionyl chlorid, butyryl chlorid, etc., can be produced in an analogous manner, by the employment of the corresponding acids, and also that the other halogen derivatives, such as acetyl bromid etc., can be produced in an analogous manner, using bromin and phosphorus tribromid as the initial materials.

The production of acetyl chlorid has heretofore been carried out by two usual methods, the first of these consisting in the action of phosphorus trichlorid on acetic acid with the aid of heating, this producing phosphorous acid as the by-product. The working up of this phosphorous acid is, however, difficult and expensive. A second method for the production of acetyl chlorid is by the action of phosphorus pentachlorid on acetic acid. This method is objectionable on account of the difficult handling of the phosphorus pentachlorid and the violence of the reaction.

Phosphorus oxychlorid has heretofore been commercially made by treating phosphorus trichlorid at boiling temperature with sodium chlorate or other strong oxidizing agent. The present process has for its object an improvement in the production of acetyl chlorid and phosphorus oxychlorid, whereby these materials are produced in an economical and safe manner, with the production of hydrochloric acid as a by-product and the production of other useful by-products.

The process may conveniently be carried out as follows: Glacial acetic acid is mixed with phosphorus trichlorid at a temperature below that at which these two materials would react with each other. It is necessary to have the temperature at the time of mixing, and to maintain this temperature throughout the reaction at below 50° C., and it is very advisable to maintain the temperature below 30° C. For carrying out the process in the safest manner and with a minimum of loss, it is advisable to maintain the temperature throughout the operation at about 10° C., until the reaction is completed. The phosphorus trichlorid and glacial acetic acid having been mixed cold, cold chlorin gas, which should be substantially dry, is introduced, while preventing undue rise of temperature. Enough chlorin gas is introduced for the completion of the following reaction:

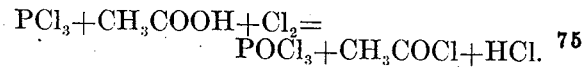

$$PCl_3 + CH_3COOH + Cl_2 = POCl_3 + CH_3COCl + HCl.$$

During this operation, the entire mixture is kept cool, preferably at or near 10° C. and, in any case below 50° C., by suitable cooling coils or cooling jackets, or both. The reaction may conveniently be carried out in lead-lined iron apparatus, since the materials used and the products, have very little action on lead. The chlorin gas can be introduced through a perforated lead pipe. A lead-lined centrifugal pump having its suction end connected to the bottom of the reaction vessel, may be used to withdraw the reaction products and if desired, this can have a discharge into the lower portion of the receptacle for the purpose of thoroughly agitating and circulating the mass during the reaction in order to maintain the temperature uniform and to prevent local overheating. The apparatus should, of course, have a vent through a lead coil reflux condenser to a device for recovering the hydrochloric acid gas evolved.

The proportions employed should be approximately (figured as chemically pure materials) 137.5 parts of $PCl_3$, 60 parts of $CH_3COOH$ and 71 parts of chlorin (all by weight).

The chlorin is introduced until the amount above stated has been introduced, at which time the reaction will be found to be complete. The resulting liquid is then fractionally distilled and the acetyl chlorid recovered separately from the phosphorus oxychlorid. This is easily accomplished since there is a wide difference between the boiling points of the two liquids. Acetyl chlorid boils at about 51° C., and phosphorus oxychlorid boils at 106.5.

In a specific example of the process, 412.5 grams of $PCl_3$ were mixed with 180 grams of 99% acetic acid, at 10° C., and while maintaining the temperature approximately constant, 213 grams of chlorin were introduced and the reaction products were then subjected to fractional distillation. 200 grams of acetyl chlorid (corresponding to 85.1% of the theoretical amount) and 380 grams of phosphorus oxychlorid (corresponding to 82.5% of the theoretical amount), were recovered, and also 100 grams of hydrochloric acid gas (corresponding to 91% of the theoretical amount) were recovered during the operation. The residue in the still was found to consist largely of phosphoric acid, which forms a by-product in the process, which can be worked up in any suitable manner.

I claim:

1. A process of making a fatty acid chlorid which comprises chlorinating a mixture containing a fatty acid and phosphorus tri-chlorid at a temperature below that at which such two materials can react with each other.

2. A process of making a fatty acid chlorid which comprises chlorinating a mixture containing a fatty acid and phosphorus tri-chlorid at a temperature below 50° C.

3. A process of making a fatty acid halid which comprises halogenating a mixture containing a fatty acid and phosphorus tri-halid at a temperature below 50° C.

4. A process of making a fatty acid halid and phosphorus oxyhalid which comprises halogenating a mixture containing a fatty acid and phosphorus tri-halid, at a temperature below that at which such two ingredients can interact, the halogenating reagent being like the halogen of the phosphorus tri-halid.

5. A process of making acetyl chlorid which comprises chlorinating a mixture containing acetic acid and phosphorus tri-chlorid, at a temperature below 50° C.

6. A process of making acetyl halid which comprises halogenating a mixture containing acetic acid and phosphorus tri-halid, at a temperature below that at which such two materials can react with each other.

7. A process which comprises chlorinating a mixture comprising phosphorus tri-chlorid and acetic acid at about 10° C.

8. A process which comprises halogenating a mixture comprising phosphorus tri-halid and acetic acid at a temperature not substantially above 10° C.

9. A process which comprises chlorinating a mixture containing phosphorus tri-chlorid and acetic acid at a temperature below 30° C.

FREDERICK J. KAUFMANN.